Oct. 22, 1957 W. NEUGEBAUER ET AL 2,810,342

PROCESS OF REPRODUCTION IN FLAT AND OFFSET PRINTING

Original Filed Jan. 13, 1949

INVENTORS
WILHELM NEUGEBAUER
JAKOB BARTHENHEIER
BY Karl Huber,
Milton F. Gilbert
ATTORNEYS United States Patent Office 2,810,342

Patented Oct. 22, 1957

2,810,342

PROCESS OF REPRODUCTION IN FLAT AND OFFSET PRINTING

Wilhelm Neugebauer, Wiesbaden-Biebrich, and Jakob Barthenheier, Eddersheim-am-Main, Germany, assignors, by mesne assignments, to Azoplate Corporation, Summit, N. J., a corporation of New Jersey Original application January 13, 1949, Serial No. 70,804. Divided and this application March 2, 1956, Serial No. 569,075

8 Claims. (Cl. 101—149.2)

Figure 1:
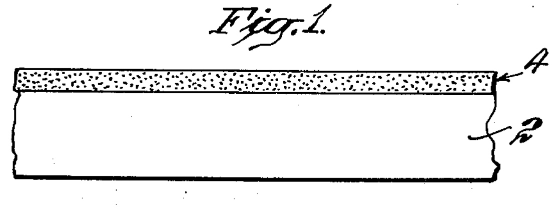
Figure 2:
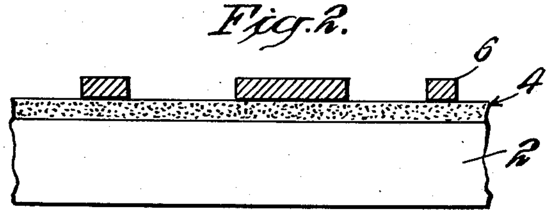
Figure 3:
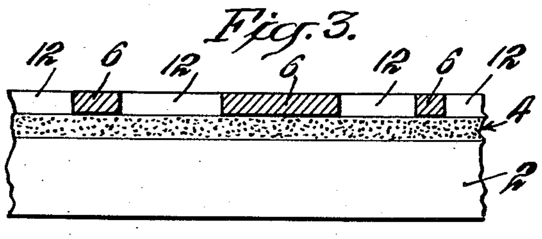
Figure 4:
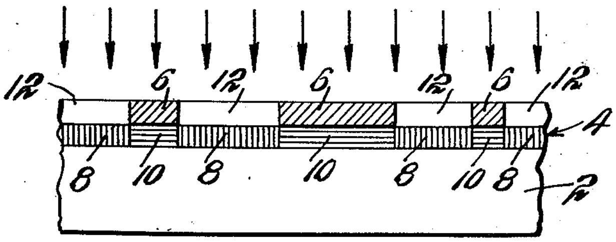
Figure 5:
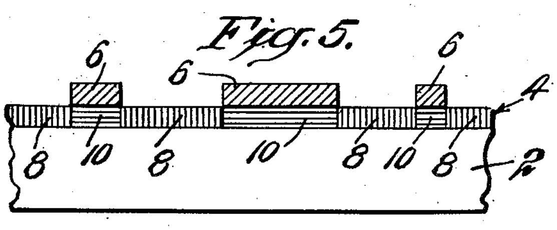

This invention relates to the production of photo-lithographic printing foils and is particularly concerned with producing printing plates from foils which have been made photo-sensitive with the aid of diazo compounds. More particularly, the invention relates to a new method of printing by means of photo-lithographic material which method does not rely on transferring the image photographically to the light sensitive base.

Foils having a hydrophilic surface photo-sensitized by means of diazo compounds have already been proposed for use in flat and offset printing. An effective method consists in producing a layer of regenerated cellulose on cellulose ester-foils, e. g. by superficially saponifying the ester-foil, applying a photo-sensitizing solution containing suitable diazo compounds to the cellulose layer and finally exposing the light sensitive foil to light under an original, thereby transforming the diazo compound at all places where it is not covered by the original (and therefore influenced by light) into a decomposition product having ready acceptance for fatty inks. At all places which were protected from direct exposure to light, the foil preserves its hydrophilic property and repels fatty ink. Thus positive prints are obtained, if negative originals are used. This known process is a photochemical one.

One object of our present invention is to provide a process of reproduction in flat and offset printing which uses as a starting material foils of the above described kind, i. e. foils having hydrophilic, non-metallic surfaces and light sensitive layers containing diazo compounds as sensitizing agent, and transforms this foil into a positive printing plate without a photographic printing step.

The process of our invention is carried out by mechanically transferring the image which is to be reproduced onto the sensitized foil, e. g. by printing, writing or drawing.

At all places where it was not protected by the transferred image the diazo compound is then transformed into a hydrophilic reaction product which is no longer light sensitive and will no longer couple with azo components. Finally the diazo compound covered by the transferred image is decomposed by exposure to light into a product which will accept fatty ink when wet. It is to be understood that the latter exposure to light is carried out without the interposition of an original.

The abovementioned objects of the invention and method of its attainment will be more fully understood by the following description taken in connection with the drawing in which:

Figure I is a view in diagrammatic elevation showing the base material having a hydrophilic surface photo-sensitized by means of a diazo compound, Figure II is a view in diagrammatic elevation showing the base material as in Figure I but with an image mechanically applied thereto, Figure III is a view in diagrammatic elevation showing the article in Figure II with a colloid substance applied thereto to cover the areas not protected by the mechanically transferred image, Figure IV is a view in diagrammatic elevation showing the article of Figure III exposed to the light to transform the photo-sensitized surface in the areas not protected by the mechanically transferred image into a hydrophilic surface and decompose the diazo compound underlying the mechanically transferred image into a printing ink receptive substance, and Figure V is a view in diagrammatic elevation showing the article of Figure IV having the colloid substance removed therefrom to give a printing ink receptive image.

The basic material 2 shown in Figure I is provided with a hydrophilic surface 4 photo-sensitized with a diazo compound which on exposure to light will decompose into a fatty printing ink receptive substances. In Figure II, a mechanically transferred image 6 is applied to the hydrophilic photo-sensitized surface 4. The areas of the photo-sensitized surface not protected by the mechanically transferred image are then transformed into hydrophilic areas.

As shown in Figure III for this purpose, the imaged foil is coated with a solution containing water soluble colloid substance. The solution containing the hydrophilic colloid substance is repelled at all areas 6 of the foil which are covered by the mechanically transferred image since these areas have hydrophilic properties. The colloid is accepted at all other areas to form a coating 12 on the foil. If now the foil is exposed to light as shown in Figure IV, either on its front surface as shown, or in the event the foil is sufficiently transparent, on its back surface, the diazo compound is transformed into a hydrophilic reaction product 8, wherever it is covered by the colloidal substance 12, i. e. at all places which are not protected by the mechanically deposited reproduction, of the image 6. At all areas 10 of the foil, which are situated under the material making up the deposited image 6, the diazo compound is converted by the light into a decomposition product which has hydrophobic properties and readily accepts fatty ink.

Suitable water soluble colloid substances are gum arabic, cellulose ethers, polyuronic acids and their salts, dextrine, sugar, polyvinyl alcohol, the polyvinyl pyrrolidones, water soluble urea resins, solutions of protein substances, polyethyleneoxide, pectin, sodium alginate, hydrogum, guar resin, the polyphosphates, e. g. sodium hexametaphosphate and others. Guar resin is defined in the Journal of the American Chemical Society, vol. 70 (1948), pages 2221 and 2222 as polysacchoxide (mannagalactan). "Hydrogum," is the commercial name used by the Harris-Seybold Company for the mesquite gum which it sells. These substances can be used alone or in combination with each other and/or with other substances adapted to improve the suppleness of the coatings formed. A neutral or weakly acid reaction of the solution of the colloid substance often improves the effect of the invention.

The usual printing colors, lithographic inks and pencils can be used for transferring the image 6 onto the light sensitive foil by printing, writing or drawing. The deposition of the picture upon the foil can also be accomplished by means of a typewriter provided with the normal typewriter ribbons. The content of coloring matter in the printing ink is not of any importance, because the inks deposited upon the light sensitive foil for the purpose of producing the image in question has as its primary purpose the repelling of the solution of the colloid substance from all areas 6 of the foil appertaining to the image.

Hence it follows, that the ink used for producing the image 6 on the foil must not necessarily be colored. A printing substance or printing ink which in the course of the exposure does not absorb at all, or absorbs only weakly, the light which is actinic to the diazo compound has some advantage in certain cases, because the exposure can also be accomplished with good success from the front surface, whereas printing inks having high absorption for this actinic light make it desirable, if not necessary, to expose the foil to the light on its back surface. In this case the foil must have sufficient light transmissibility.

Foils or bases 2 which can be used for the new reproduction process are foils made of cellulose esters which are transformed to regenerated cellulose by means of saponification to a depth of about 10–20$\mu$. Foils produced from polyvinyl esters or similar saponifiable plastics and having saponified surfaces can also be used. A modification of the method consists in applying the esters or other saponifiable plastics in the form of a lacquer to a base, such as a sheet of metal or paper or the like, and superficially saponifying the lacquer coat.

Furthermore, it is possible to back the foils with sheets of metal, plastic material and other substances. This modification of the process is to be recommended, if the foils have been made of regenerated cellulose, which foils do not have a satisfactory dimensional stability under the operating conditions in flat-bed printing, i. e. in the presence of water, unless the foils have been backed with a non-swelling base.

The process of the present invention can also be applied to paper foils or bases. A paper sheet having a hydrophilic surface with a minimum of porosity is to be preferred. Thus, parchment paper foils offer distinct advantages. The paper base is preferably rendered water-proof according to known methods. This can be done by treating the paper with urea resins. Also paper foils having hydrophilic surface layers, which may be applied by means of a brush, can be used.

The expression "foils having a hydrophilic non-metallic surface" is believed to designate in the best manner all the abovementioned suitable base materials. Foils backed with sheet metal are intended to be included.

Any known diazo compound which upon exposure to light decomposes into a printing ink receptive substance may be used for producing the light sensitive layer, however it is preferred to use the diazo compounds of higher molecular weight corresponding to the general formula $$R—Y—Ar—N_2—X$$

wherein

R=an aryl, aralkyl, a higher alkyl or an aroyl residue,
Y=O, S, NH or $NR_1$, $R_1$ standing for alkyl, aralkyl or aryl,
Ar=an aromatic residue, and
X=an equivalent of an anion of an acid.

We understand the term "aroyl" to include in its scope the acyl radicals of aromatic carboxylic acids, e. g. benzoyl. The expression "equivalent of an anion of an acid" is intended to designate radicals such as $—Cl^-$, $SO_4^=$, $ZnCl_4^=—$, $—C_6H_5SO_3^-—$ and the like.

The substituent Y and the diazo group $N_2$ may preferably be in a para-position to each other. The aromatic residue Ar, the group R and the NH-group may contain further substituents. In most cases it is advantageous that the residues R and Ar are substituted by alkoxy, aroxy or N-aryl-sulfamido groups, or by one or more halogen atoms. In the diazo compound of the formula $$\begin{matrix} R \\ \quad\diagdown \\ \quad\; N—Ar—N_2—X \\ \quad\diagup \\ R_1 \end{matrix}$$

as above defined (i. e. where $Y=NR_1$) the substituents R and $R_1$ can be connected with one another to form a cyclic compound, or R or $R_1$ can be connected with Ar by a covalent linkage, but is not desirable to have sulfo groups as substituents in any of R, $R_1$ and Ar.

The diazo compounds represented by the above formula, may be treated with an aldehyde, e. g. formaldehyde, to be transformed into condensation products of higher molecular weight. The sulfonates of all the abovementioned diazo compounds, and their aldehyde condensation products respectively (which sulfonates are to be prepared by acting upon a diazo compound with a sulfite in a known manner), can also be used. Also useable are the diazo amino compounds obtained from the above named diazo compounds and their aldehyde condensation products, respectively, as reaction products of a treatment with amines under known conditions.

The light sensitive layers can be incorporated with the usual additions in the diazotype process, e. g. with acids or stabilizing salts.

The invention may be illustrated by the following examples:

*Example 1*

A parchment paper sheet is coated with a 1% aqueous solution of the diazo compound of 4-amino-1-(N-(2',3',4',6'-tetrachlorobenzyl))-aminobenzene and subsequently dried. By means of a printing machine an image is transferred onto the sensitized paper foil and then the foil is coated with a solution, containing 75 parts of water, 25 parts of dextrine and 1 part of phosphoric acid, to form a film covering the foil. When dry, the back surface of the foil is exposed to light. At all areas covered by the image the diazo compound is decomposed to form a hydrophobic substance, that is the base for the fatty ink. This printing foil permits a great number of impressions to be printed on flat and offset printing machines.

*Example 2*

A superficially saponified foil of cellulose acetate is coated with a 3% solution of the sulfonate of the diazo compound named in Example 1 (the sulfonate is prepared by acting with sodium sulfite upon the diazo compound in a soda alkaline solution) and then dried. An image is applied on a printing machine and the foil is coated with a 15% aqueous solution of gum arabic and dried. Subsequently it is exposed to light on its back surface until the yellow color of the diazo compound has disappeared. Now water and fatty ink are applied to the foil and it can be used for printing in the usual manner.

*Example 3*

A superficially saponified cellulose acetate foil is coated with an aqueous suspension of the diazo amino compound of 4-amino-1-[N-(2',6'-dichlorobenzyl)]-amino-benzene and guanidine, and then dried. The diazo amino compound is prepared in a known manner from said diazo compound by acting upon it with guanidine nitrate in soda alkaline solution. The light sensitive foil is provided with an image in a printing machine and coated with a film of mesquite gum, deposited from a 10% aqueous solution of mesquite gum which is applied to the foil and dried. The base for the fatty ink is produced by exposing the foil to light. Water and fatty ink are applied to the foil and the foil is then ready for printing.

*Example 4*

A parchment paper foil which has been coated with a 3% aqueous solution of the hydrochloride of the diazo compound of 4-[N-(2,6-dichlorobenzyl)]-amino aniline and dried is provided with an image with the aid of a typewriter. A 10% aqueous solution of gum arabic is now applied to the sensitized side of the foil which is dried by means of hot air and then exposed to light until the diazo compound is decomposed, the fading of the diazo compound being a criterion of its decomposition. Preferably, the foil is exposed to light on its back surface. Now the foil is mounted in an offset printing machine and washed with water by means of a sponge. The foil is now ready for printing.

*Example 5*

A cellulose acetate foil is saponified to a depth of 15$\mu$ and coated with a 2.5% solution of the condensation product prepared from the diazo compound of p-amino-diphenylamine and formaldehyde. The excess of the solution is wiped off and the foil is dried. An image is applied to the photosensitized foil by means of a printing process or a lithographic pencil. Subsequently, the sensitive layer provided with the image is coated with a 5% aqueous dextrine solution and exposed to light to decompose the diazo compound. The rest of the procedure is the same, as has been described in Example 1, and positive prints are obtained.

*Example 6*

A paper foil is sensitized with a 3% aqueous solution of the sulfonate of the condensation product named in Example 6 and, after having been dried, the foil is provided with an image by means of a typewriter. After a 4% aqueous solution of polyvinylpyrrolidone has been spread on the foil it is dried and exposed to light on its back surface until the diazo compound fades. The remaining procedure is the same as that described in Example 6, resulting in the production of positive prints.

After having clearly described our present invention, we claim:

1. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photo-sensitive material, applying an aqueous solution of a water soluble organic colloid substance to the light sensitive surface of the material and exposing the material to light to transform the diazo compound not covered by said mechanically transferred image into a hydrophilic substance and to decompose the diazo compound covered by said mechanically transferred image into a hydrophobic printing ink receptive substance.

2. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photo-sensitive material, applying an aqueous solution of a water soluble organic colloid selected from the group consisting of gum arabic, cellulose ethers, polyuronic acids and their salts, dextrine, sugar, polyvinyl alcohol, polyvinyl pyrrolidones, water soluble urea resins, water soluble protein substances, polyethyleneoxide, pectin, sodium alginate, mesquite gum and mannogalactan to the light sensitive surface of the material and exposing the material to light to transform the diazo compound not covered by said mechanically transferred image into a hydrophilic substance and to decompose the diazo compound covered by said mechanically transferred image into a hydrophobic printing ink receptive substance.

3. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photosensitive material, applying an aqueous solution of gum arabic to the light sensitive surface of the material and exposing the material to light to transform the diazo compound not covered by said mechanically transferred image into a hydrophilic substance and to decompose the diazo compound covered by said mechanically transferred image into a hydrophobic printing ink receptive substance.

4. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photosensitive material, applying an aqueous solution of mesquite gum to the light sensitive surface of the material and exposing the material to light to transform the diazo compound not covered by said mechanically transferred image into a hydrophilic substance and to decompose the diazo compound covered by said mechanically transferred image into hydrophilic substance and to decompose the diazo compound covered by said mechanically transferred image into a hydrophobic printing ink receptive substance.

5. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photosensitive material, applying an aqueous solution of dextrine to the light sensitive surface of the material and exposing the material to light to transform the diazo compound not covered by said mechanically transferred image into a hydrophilic substance and to decompose the diazo compound covered by said mechanically transferred image into a hydrophobic printing ink receptive substance.

6. A process, for making printing material from photosensitive material having a hydrophilic, non-metallic surface sensitized with a light sensitive diazo compound which upon exposure to light decomposes into a printing ink receptive substance, comprising the steps of mechanically transferring an image onto the photosensitive material, applying an aqueous solution of polyvinyl pyrrolidone to the light sensitive surface of the material and exposing the material to light to transform the diazo compound not covered by said mechanically transferred image into a hydrophilic substance and to decompose the diazo compound covered by said mechanically transferred image into a hydrophobic printing ink receptive substance.

7. A process for making printing foils useful in flat and offset printing, comprising mechanically transferring an image onto a foil having a hydrophilic non-metallic surface which is photosensitized by means of a diazo compound of the group consisting of diazo compounds of the general formula $$R-Y-Ar-N_2-X$$

wherein

R=a member of the group consisting of aryl, aralkyl, higher alkyl and aroyl residues,
Y=a member of the group consisting of O, S, NH and $NR_1$, $R_1$ standing for alkyl, aralkyl or aryl,
Ar=an aromatic residue, and
X=an equivalent of an anion of an acid, their aldehyde condensation products, the sulfonates and diazo amino compounds of said diazo compounds and their aldehyde condensation products respectively, applying an aqueous solution of a water soluble organic colloid substance to the light sensitive surface of the foil, and exposing the foil to light and washing it with water.

8. A process for making printing foils useful in flat and offset printing, comprising mechanically transferring an image onto a saponified cellulose ester foil photosensitized by means of a diazo compound of the group consisting of diazo compounds of the general formula $$R-Y-Ar-N_2-X$$

wherein

R=a member of the group consisting of an aryl, aralkyl, a higher alkyl and aroyl residues,
Y=a member of the group consisting of O, S, NH, and $NR_1$, $R_1$ standing for alkyl, aralykyl or aryl,
Ar stands for an aromatic residue, and
X=an equivalent of an anion of an acid, their aldehyde condensation products, the sulfonates and diazo amino compounds of said diazo compounds and their aldehyde condensation products respectively, applying an aqueous solution of a member of the group consisting of gum arabic, cellulose ethers, polyuronic acids and their salts, dextrine, sugar, polyvinyl alcohol, the polyvinyl pyrrolidones, water soluble urea resins, water soluble protein substances, polyethyleneoxide, pectin, sodium alginate, mesquite gum and mannogalactan to the light sensitive surface of the foil, exposing the foil to light and washing it with water.

No references cited.